W. V. TURNER.
CUT-OFF VALVE DEVICE.
APPLICATION FILED APR. 12, 1917.
1,297,510.
Patented Mar. 18, 1919.
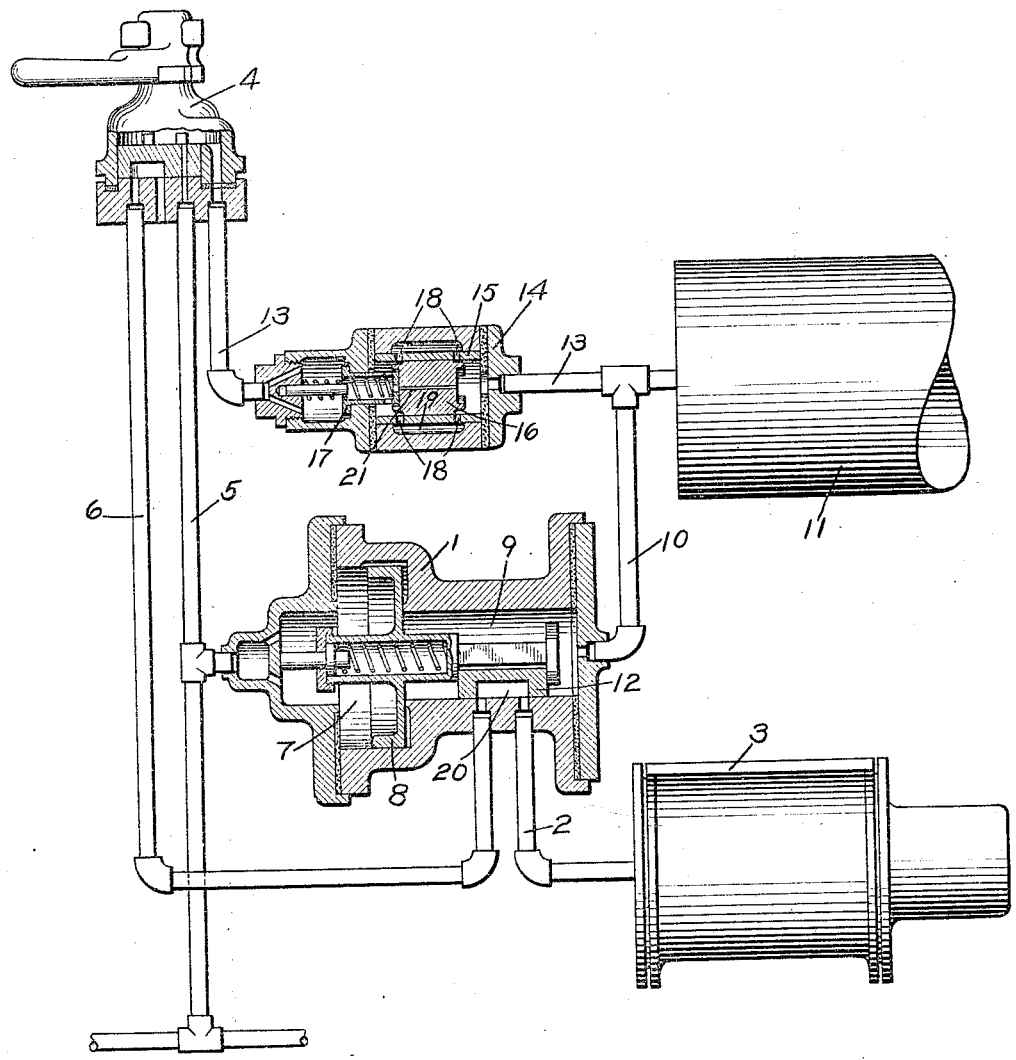
INVENTOR
Walter V. Turner
by Wm. M. Cady
At'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CUT-OFF-VALVE DEVICE.

1,297,510.  Specification of Letters Patent.  Patented Mar. 18, 1919.

Application filed April 12, 1917. Serial No. 161,591.

*To all whom it may concern:*

Be it known that I, WALTER V. TURNER, a citizen of the United States, residing at Wilkinsburg, in the county of Allegheny and State of Pennsylvania, have invented new and useful Improvements in Cut-off-Valve Devices, of which the following is a specification.

This invention relates to fluid pressure brakes, and more particularly to a combined automatic and straight air brake system.

In certain types of combined automatic and straight air brake equipments, a supply pipe connects the main reservoir with the brake valve device and the main reservoir also supplies fluid to an emergency valve device for effecting an emergency application of the brakes.

If the supply pipe to the brake valve should break, fluid under pressure in the main reservoir would be lost, and the brakes could not be applied either by straight air or by operation of the emergency valve device.

The principal object of my invention is to provide means operated upon a rapid reduction in pressure in the supply pipe, such as might occur upon the breaking of the pipe, for cutting off the usual flow of fluid from the main reservoir through said pipe.

In the accompanying drawing, the single figure is a diagrammatic view, partly in section, of a fluid pressure brake equipment embodying my invention.

A combined straight air and automatic emergency brake equipment is shown in the drawing, comprising an emergency valve device 1 connected by a pipe 2 to a brake cylinder 3 and a brake valve device 4 connected to an emergency brake pipe 5 and a straight air pipe 6.

The emergency valve device 1 may comprise a casing having a piston chamber 7 connected to brake pipe 5 and containing piston 8 and having a valve chamber 9 connected by pipe 10 to a main reservoir 11 and containing a slide valve 12.

Interposed in the main reservoir supply pipe 13, near the main reservoir, is a check valve device 14, comprising a casing containing a bushing 15 within which is mounted a check valve 16.

Normally, a spring pressed stop 17 maintains the check valve 16 in an intermediate position in which ports 18 in the bushing and on opposite sides of the check valve, connect one side of the check valve with the opposite side through an annular chamber 19.

The brakes may be applied or released by straight air in the usual manner upon manipulation of the brake valve 4 to supply or release fluid to or from the straight air pipe 6 which is normally connected to the brake cylinder 3 through cavity 20 in slide valve 12 of the emergency valve device 1.

If a sudden reduction in brake pipe pressure is effected, the emergency piston 8 is shifted so as to cause slide valve 12 to open pipe 2 to valve chamber 9 and thus permit the direct supply of fluid from the main reservoir 11 to the brake cylinder 3.

Should the supply pipe 13 break and cause a rapid reduction in pressure therein, the higher main reservoir pressure acting on the main reservoir side of the check valve 16 will cause the movement thereof to its left hand seat, against the resistance of the spring stop 17, so as to cut off communication from the main reservoir and thus prevent loss of main reservoir pressure by escape of fluid at the break in the supply pipe.

If the operator should not be aware of the break in the supply pipe, he might attempt to make a straight air application of the brakes, but when he finds that no brake is obtained, he can turn the brake valve to emergency position and thereby cause the operation of the emergency valve device 1 and since the main reservoir pressure has been retained by the operation of the check valve 16, the brakes will be applied and the car brought to a stop.

In order to effect the release of the brakes the break in the supply pipe must first be closed, and then it is necessary to supply fluid to the brake pipe 5 by manipulation of the brake valve in order to effect the release of the brakes, but since the check valve 16 is in its seated position, the usual flow of fluid from the main reservoir to the brake valve is cut off.

In order to provide for recharging the brake pipe under the above conditions, a restricted port 21 is provided through the check valve 16, so that a sufficient flow of fluid from the main reservoir can still be obtained to effect the recharging of the brake pipe 5.

While this restricted port will permit air from the main reservoir to escape when the supply pipe is broken, the port is so restricted, that the loss of fluid will be insignificant.

Having now described my invention, what I claim as new and desire to secure by Letters Patent, is:

1. In a fluid pressure brake, the combination with a brake valve device, a source of fluid under pressure, and a supply pipe for supplying fluid from the source of fluid to the brake valve device, of means operated upon a breaking of the supply pipe for cutting off communication from the source of fluid pressure supply through said supply pipe.

2. In a fluid pressure brake, the combination with a brake valve device, a main reservoir, and a supply pipe connecting the main reservoir with the brake valve device, of means normally providing communication through said pipe and operated upon a rapid reduction in pressure in the pipe for cutting off said communication.

3. In a fluid pressure brake, the combination with a brake valve device, a main reservoir, and a supply pipe connecting the main reservoir with the brake valve device, of a check valve having a normally open passage for supplying fluid from the main reservoir through said pipe and operated upon a rapid reduction in pressure in said pipe for closing said communication.

4. In a fluid pressure brake, the combination with a brake valve device, a source of fluid under pressure, and a supply pipe connecting said source to the brake valve device, of a check valve normally providing communication through said pipe and operated upon a sudden reduction in pressure in said pipe for closing said communication and having a restricted port for permitting flow of fluid through said pipe in the closed position of the check valve.

5. In a fluid pressure brake, the combination with a brake valve device, a source of fluid under pressure, and a supply pipe connecting said source to the brake valve device, of a check valve having a normal position in which a communication is open from the source of fluid under pressure through said pipe and a yielding stop for defining said position, said check valve being operated upon a rapid reduction in pressure in said pipe for closing said communication.

In testimony whereof I hereunto set my hand.

WALTER V. TURNER.

Copies of this patent may be obtained for five cents each, by addressing the "Commissioner of Patents. Washington, D. C."